Figure 1:
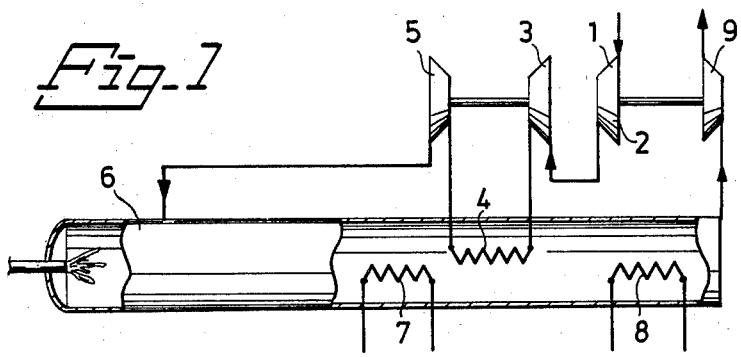

United States Patent [19]

Tieberg et al.

[11] 4,392,809

[45] Jul. 12, 1983

[54] METHOD AND PLANT FOR RECOVERING HEAT FROM SMOKE GASES

[76] Inventors: Lars A. Tieberg, Sju Blommors gränd 3, Fagersta, Sweden, S-773 00; Stig G. Carlqvist, Sånekullavägen 43, Malmö, Sweden

[21] Appl. No.: 241,618

[22] Filed: Mar. 9, 1981

[30] Foreign Application Priority Data

Mar. 19, 1980 [SE] Sweden .............................. 8002144

[51] Int. Cl.³ ............................................ F23D 11/44
[52] U.S. Cl. .................................. 431/11; 60/39.183; 431/215
[58] Field of Search ......................... 431/2, 11, 215; 60/39.18 C

[56] References Cited

U.S. PATENT DOCUMENTS

| | | | |
|---|---|---|---|
| 2,478,851 | 8/1949 | Traupel | 60/39.18 C |
| 3,871,172 | 3/1975 | Villiers-Fisher et al. | 60/39.18 C |
| 4,043,120 | 8/1977 | Huffeins | 60/39.18 C |

*Primary Examiner*—Edward G. Favors
*Attorney, Agent, or Firm*—Pasquale A. Razzano

[57] ABSTRACT

A method and plant for recovering heat from smoke gases in combustion plants, whereat the combustion air is compressed prior to being supplied to the combustion chamber of the plant. The compressed smoke gases from the combustion chamber are cooled, at a pressure which exceeds 1.5 atmospheres, to a temperature beneath 100° C., preferably beneath 80° C., and are then caused to expand in a turbine, whereat the energy released by said expansion is utilized for compressing the air of combustion.

The plant comprises one or more compressors (2) which are arranged upstream of the combustion chamber (6) of the combustion plant and which compress the air of combustion; and a turbine (9) arranged downstream of the combustion chamber or chambers (6) for expanding the compressed smoke gases. The turbine (9) is mechanically connected to an associated compressor (2), so that the kinetic energy developed by the turbine through expansion of the smoke-gases is utilized in the compressor (2) for compressing the air of combustion. Connected between the last combustion chamber (6) in the system and the turbine (9) is a smoke-gas cooler (7,8) which works at a smoke-gas pressure exceeding 1.5 atmospheres and in which the smoke gases are cooled to a temperature which is lower than 100° C., preferably lower than 80° C.

9 Claims, 7 Drawing Figures

METHOD AND PLANT FOR RECOVERING HEAT FROM SMOKE GASES

The present invention relates to a method and a plant for recovering heat from smoke gases, whereat the air of combustion is compressed by means of a compressor before being introduced into the combustion chamber of the plant. The compressed smoke gases are caused to expand downstream of the combustion chamber in a turbine or expander, whereat the turbine is connected to the compressor, so that the kinetic energy developed by the turbine through the expansion of the smoke gases is utilized in the compressor for compressing the air of combustion.

When burning such hydrogen-containing fuels as wood, peat, oil or gas for heating purposes, normally only 60 to 80% of the total heat content of the fuel is utilized. The largest loss normally comprises the physical heat of the smoke gases. It is essential that the heat content of the dry smoke gases corresponds to 10–15% of the heat content of the fuel and that the heat of vaporization of the water vapour (5–15% by volume) contained in the smoke gases corresponds to 5–10% of the heat content of the fuel, according to the hydrogen content, the water content and the fuel to air ratio of the fuel. With higher water contents there are obtained larger quantities of steam or water vapour, so that when, for example, burning peat containing 50% water and a 30% air surplus, the smoke gases contain 20% water vapour. If it were possible to utilize the energy of condensation of the water vapour, the useful heat-exchange of the fuel could be greatly increased. The reason why the energy of condensation can not be readily utilized, is because condensation of the water vapour takes place at excessively low temperatures.

The possibility of lowering the temperature of the smoke gases to a level beneath those temperatures applied in conventional techniques, so as to be able to recover more heat from said gases, is limited, inter alia, by the temperature of the heat-absorbing medium, which temperature in the case of heat-conducting systems utilizing water-carried heat varies between 35°–90° C., depending on the type of heating system used, the location in the system to which heat is applied, and the ambient temperature. It is normal for the return water from a heat-conducting system to maintain a temperature of between 30°–50° C., and for the temperature of the water leaving the heat-conducting system to be 35°–60° C. The water is normally heated in the boiler to a temperature of 70°–90° C., and the lower temperature of the output water is obtained because the boiler water is mixed with return water in a shunt valve. A certain temperature difference must always be maintained between the heated medium (the water) and the heating medium (the smoke gases), otherwise a heat-exchange surface of indefinite size would be required. This means that with conventional techniques it is not realistic to cool the smoke gases to temperatures beneath 80°–100° C. with the boiler water, or to beneath 40°–60° C. when finally cooling with return water. This also means that very little of the heat content of the water vapour contained by the combustion gases can be made useful. The water vapour does not begin to condense until cooled to temperatures of about 50° C.

An object of the present invention is to provide a method and a plant for recovering heat from the combustion gases or smoke gases by cooling said gases under a pressure above atmospheric so that the water vapour condenses at higher temperature, and therewith to render the energy recovered by this additional step useful for heating purposes.

The method and plant according to the invention are characterized in that the residual heat of the smoke gases is utilized by terminally cooling the smoke gases under elevated pressure, whereat the compressed smoke gases from the combustion chamber are cooled in a smoke-gas cooler at a pressure which exceeds 1.5 atmospheres to a temperature beneath 100° C., preferably beneath 80° C., and are caused, downstream of the cooler, to expand in a turbine, whereat the energy released by said expansion is utilized for compressing the air of combustion.

The compression to elevated pressure is effected by utilizing energy from the heat source. The elevated pressure causes firstly condensation of the water vapour in the smoke gases to commence at a higher temperature, thereby enabling it to be utilized more readily than when cooling at atmospheric pressure, and secondly the gases to expand in a turbine after the terminal cooling step, and that through said expansion mechanical work is obtained which can be utilized at the same time as the gases, during said expansion, are cooled to lower temperatures. The temperature of the smoke gases subsequent to the terminal expansion step may be equal to the ambient temperature or lower than ambient temperature.

If smoke gases containing 20% by volume water vapour are cooled, for example, at atmospheric pressure, condensation commences at 60° C. If, on the other hand, the pressure is raised to two atmospheres, the water vapour will commence to condense at 76° C., and at five atmospheres at 100° C.

One particular characteristic feature of the invention resides in the fact that the combustion process is effected in two or more combustion chambers. In one or more combustion chambers combustion is effected under constant conditions with regard to temperature, gas flow and fuel flow. Arranged downstream of the combustion chambers are turbines or gas/gas heat-exchangers which require constant operating conditions. In the last combustion chamber in line, the fuel charge thereto may vary from no-charge to full-charge. Arranged downstream of said last combustion chamber are coolers in which the combustion gases are cooled from a relatively high temperature (normally in the region of 600°–800° C.) to a temperature which lies in the region of the temperature of the incoming cooling water. This means that the gas is normally cooled to between 40° and 100° C. Calculations have shown that when cooling thus, the final temperature of the gases will only vary slightly, even though the temperature of the gases entering the cooler vary within wide limits. If, for example, the gas input temperature is 1800° C., the cooling water is held at 60° C. and the output temperature is 70° C. If, on the other hand, the input temperature is lowered from 1800° C. to 600° C., the output temperature will not drop to lower than about 64° C. when the temperature of the cooling water remains unchanged, i.e. is 60° C. Such a small variation in the temperature of the outgoing gases as 70° and 64° C. will have no decisive effect on the following turbine.

According to the invention the desired, substantially constant temperature in the last expander in line is obtained by cooling the gas to a temperature close to the temperature of the cooling medium, at a location upstream of said expander. A simple, free-running turbine-compressor (supercharger) reaches maximum efficiency within a working range of ±5–10% of the gas flow. This means that the absolute temperature should not vary more than ±5–10%. If the gas is cooled to a temperature which at maximum load is not in excess of the temperature of the cooling medium by more than 20%, it will not, theoretically, be able to vary by more than about ±10%.

Those plants or systems with which the invention is concerned provide, when oil fired, a control range of 30–100% or a factor of 3. In the case of fuels having a low calorific value, the possibility of obtaining good regulation in this way decreases. One way of solving the problem is to connect a plurality of compressors and expanders in parallel, whereat regulation is achieved by engaging a larger or smaller number thereof.

In large commercial turbines, the pressure ratios in both compressor and turbine are normally 6:1 and 10:1. This leads to high compression temperatures and therewith high compression work at the end of the compression process. Correspondingly, the power developed at the end of the expansion process is low. By dividing the compression process and the expansion process between several machines in series, it is possible to adjust the temperatures between the different machines. In the case of multi-stage compression the air or gas is cooled between the various stages, while in the case of multi-stage expansion the gas is heated between stages.

By working in three or more stages, significant improvement can be had when intermediate cooling and intermediate heating are applied with compression and expansion. This improvement resides in the possibility of maintaining a high pressure in the cooler before (upstream of) the final expansion stage. This results in a more complete condensation of the water vapour and a higher power output of the last turbine in line, said power output being transmitted to the incoming air via the compressor. The improvement is obtained partly through the higher efficiency afforded by the intermediate cooling and intermediate heating steps, and partly through the fact that the system is operated to a high total pressure with the burning and intermediate cooling of the gases before each turbine stage.

The invention will now be described in more detail with reference to the accompanying FIGS. 1,2,3,5,6 and 7, which illustrate six different embodiments of a system according to the invention applied in a combustion plant for heating purposes. FIG. 4 illustrates an embodiment of a plant which can be used for controlling the cooling of the smoke gases.

In the plant illustrated in FIG. 1, air of combustion is supplied at 1 to a pre-compressor 2, and further compression of the air of combustion takes place in a compressor 3, whereafter the air of combustion is preheated in a heat exchanger 4. The heated and compressed air of combustion is then expanded in an expander 5, which mechanically drives the compressor 3. Downstream of the expander or turbine 5 the air, which is still under an over-pressure, is supplied to a combustion chamber 6, to which fuel is also supplied and in which combustion takes place. Subsequent to said combustion, the smoke gases pass to a heat-exchanger 7, in which the smoke gases are pre-cooled with water to a temperature adapted to the heat-exchanger 4. Residual heat of the smoke gases, including part of the heat of condensation of the water vapour, is recovered in a combined heat-exchanger/condensor 8. The smoke gases or the gases of combustion are finally allowed to expand in an expander or turbine to a low temperature, at the same time as the kinetic energy developed is caused to drive the compressor 2 mechanically connected to the turbine 9.

Figure 2:
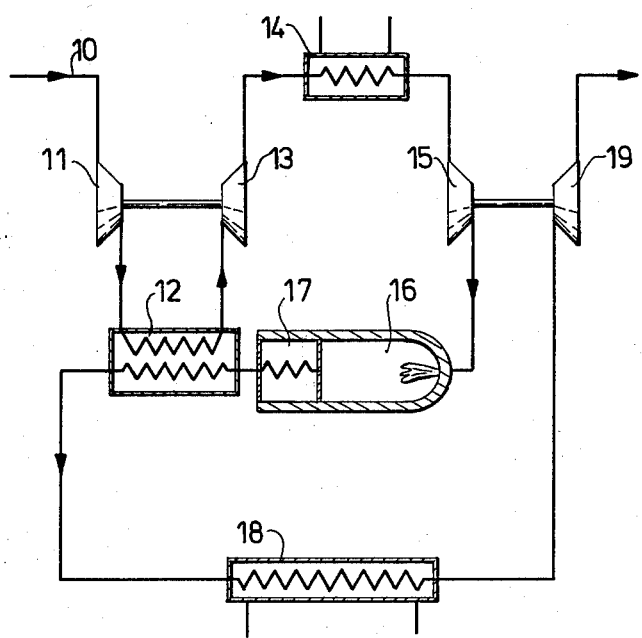

In the embodiment illustrated in FIG. 2, air of combustion is drawn in by suction at 10 to a compressor 11. Subsequent to said compression, the air of combustion is heated in a heat-exchanger 12 to a tempeature above 600° C. The air is then caused to expand in an expander 13 to a pressure which lies above atmospheric pressure. The air is then cooled in a heat-exchanger 14, and then compressed in a compressor 15. The compressed air of combustion is then mixed with oil, which is burned in a combustion chamber 16. The gases of combustion, or the smoke gases, from the combustion chamber 16 are pre-cooled in a heat-exchanger 17, and then further cooled in the heat-exchanger 12. The smoke gases are finally cooled in a heat-exchanger 18 to a low temperature (beneath 100° C., preferably beneath 80° C.), and in the last expansion stage in the expander or turbine 19 the smoke gases have a low final temperature, which may be equal to the ambient temperature or lower than said temperature.

Figure 3:
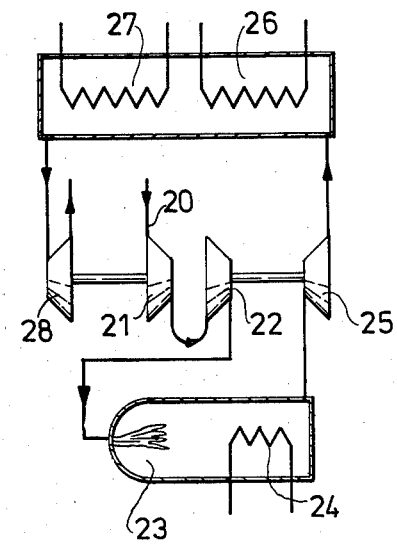
Figure 4:
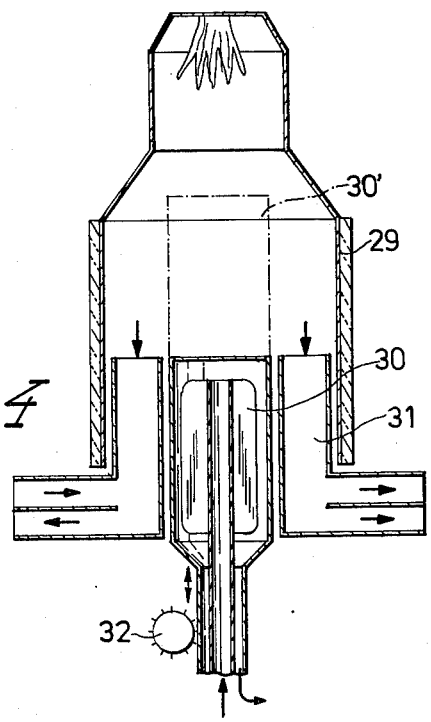

In the embodiment illustrated in FIG. 3, the air of combustion is drawn in by suction at 20 and compressed in the compressors 21 and 22. The air is then mixed with oil and the mixture burned in a combustion chamber 23. The smoke gases generated in the combustion process are cooled in a heat-exchanger 24 to a temperature higher than 600° C., and are then expanded in an expander 25 to a pressure which is higher than atmospheric pressure (higher than 1.5 atmospheres). The expander or turbine 25 is mechanically connected to the compressor 22 and drives said compressor as the smoke gases expand. The smoke gases are finally cooled in two coolers 26 and 27 to the greatest possible extent in practice with available water systems. In so doing part of the water vapour of the smoke gases (smoke gas temperature about 50° C.) condenses. Finally the smoke gases are expanded in an expander or turbine to a pressure corresponding to atmospheric pressure, whereat the kinetic energy generated by the turbine is used to drive the compressor 21, which is mechanically connected to the turbine 28.

As described above the smoke gases are cooled to a temperature beneath 100° C., preferably beneath 80° C. In a special embodiment the smoke gases are cooled to a temperature beneath 50° C.

Small boilers are normally regulated according to the fully on/fully off principle, i.e. the boiler either runs at full power or the burner is completely shut off. On the other hand, it is desirable in the case of large boilers to continuously control the boilers from a maximum power output down to lower power outputs. It is possible to regulate the output of a boiler in this way by means of a plant according to the invention. This control is obtained by decreasing the amount of gas or oil introduced into the combustion chamber, while at the same time decreasing the extent to which cooling is effected between the combustion chamber and the expander. The decrease in the temperature of the combustion gases caused by the decrease in the amount of fuel charged to the combustion chamber is compensated for by reducing the extent to which cooling takes place, so that the amount of gas which leaves the cooler (which is variable) per unit of time is substantially unchanged and so that the temperature of the gas also remains substantially the same. The advantage afforded by such control resides in the fact that the compressor/expander unit, the efficiency of which varies greatly with temperature and, in the case of turbocomponents, also with the rate of gas flow, constantly works at a uniform load. In order to obtain this control of the cooling process, a special device is required, for example a device of the kind illustrated in FIG. 4. Incorporated in a heat-insulated smoke-gas passage 29 is a movable, water-cooled metal body whose upper position is referenced 30'. When occupying its lower position, the water-cooled body is enclosed by an annular heat-exchanger 31, and is cut off from direct contact with the hot smoke gases by said heat-exchanger. With the aid of a motor 32 the cooling body or metal body 30 can be moved out of the heat-exchanger 31 towards the hot smoke gases, to a position illustrated in dash lines at 30', whereat the cooling body pre-cools the smoke gases before they enter the annular heat-exchanger 31. An automatic control system can be arranged which displaces the cooling body outwardly if the smoke-gas temperature in the heat-exchanger increases, so that the gas is pre-cooled until the gas temperature in the heat-exchanger has again fallen to a given value.

Figure 5:
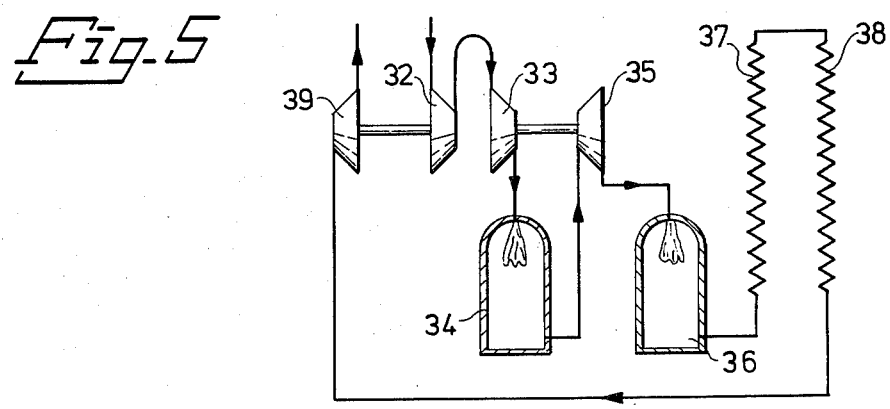

FIG. 5 illustrates an embodiment having two free-running turbine-compressors. Air is taken in through the two compressors 32 and 33 and into the combustion chamber 34. The amount of fuel charged to the combustion chamber is such as to obtain a suitable input temperature to the turbine 35. The turbine is mounted on the same shaft as the compressor 35 and drives said compressor. The combustion gases expand in the turbine 35 to a pressure which is still higher than atmospheric. The expanded gas is fed to the combustion chamber 36, in which the fuel input can be varied from zero to full load. After the combustion chamber 36, the smoke gases are cooled in coolers 37 and 38 and are expanded finally in the turbine 39, which drives the compressor 32. In the illustrated system the compressors 32 and 33 are driven with constant load and can therefore constantly work with optimum efficiency. The same is true of the turbine 35 and the combustion chamber 34. The turbine 39 is driven with a quantity of gas and a gas temperature which vary within a range so narrow that the turbine will also work with optimal efficiency.

Figure 6:
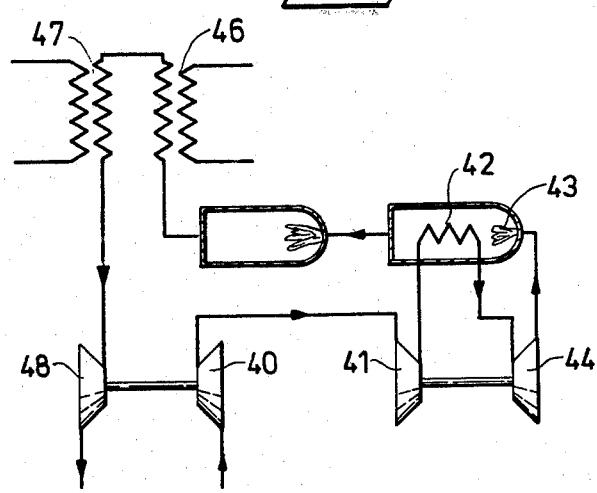

FIG. 6 illustrates an embodiment in which, similar to the FIG. 5 embodiment, the air is compressed in two compressors, here referenced 40 and 41. In the FIG. 6 embodiment, however, when leaving the compressors 40, 41 the air passes through an air-preheater 42 in which the air is heated by the combustion gases from the combustion chamber 43. The air heated in the air preheater 42 is expanded in the turbine 44. When leaving the turbine, the pressure of the air is still higher than atmospheric and is introduced into the combustion chamber 43 together with the fuel. The fuel flow is held constant and is selected so that a suitable temperature is obtained with respect to the air preheater 42. After the combustion chamber 43, the combustion gases are introduced into the combustion chamber 45, where additional fuel can be charged. The charge can vary between zero and full load. The remainder of the system is similar to the FIG. 5 embodiment, and includes coolers 46 and 47, and turbine 48.

Figure 7:
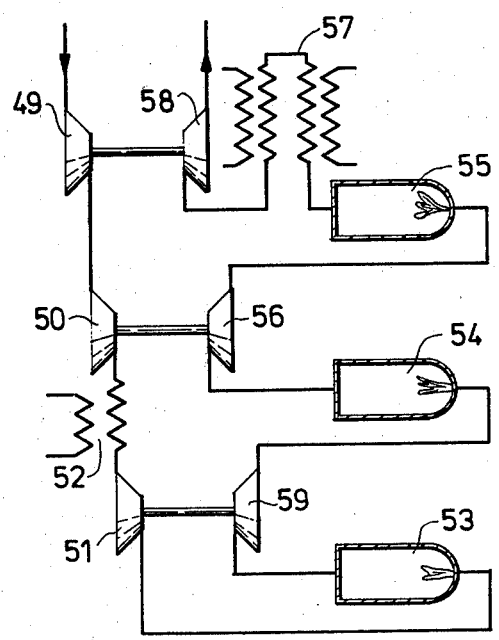

FIG. 7 illustrates a system in which more than two turbine-compressor units are employed. In this embodiment the air of combustion is compressed in three stages, in compressors, 49, 50 and 51. In order to decrease the work required to compress said air, the air is cooled in a cooler 52 intermediate of the compressors 50 and 51. The compressed air is combusted with a constant flow of fuel in the combustion chamber 53. The combustion gases are then expanded in three stages with additional combustion in the combustion chambers 54 and 55, whereat the flow of fuel to the combustion chamber 54 is adapted in a manner to obtain a suitable temperature in the turbine 56, while the flow of fuel to the combustion chamber 55 is variable and selected so as to obtain the desired heating effect. The combustion gases are cooled to a low temperature in the cooler 57 prior to the last expansion to atmospheric in the turbine 58. Compared with the other aforedescribed embodiments, the FIG. 7 embodiment affords the advantage whereby a higher pressure can be obtained in the last condensating cooler 57.

A common feature of all the aforedescribed systems according to the invention is that the smoke gases are cooled to an extent such that part of the water vapour contained therein condenses. This means that if the water is vaporized in the air of combustion or the smoke gases prior to the terminal cooling stage it is still possible to make use of the heat of vaporization in the terminal cooler. By adding water intentionally to the air of combustion or the smoke gases it is possible to substantially increase the power, partly because the combustion process is improved and partly because the water vapour increases the total amount of gas and therewith the power developed in the expanders or turbines. If, for example, water is supplied to the combustion chamber 23 in the plant illustrated in FIG. 3, the amount of gas supplied to the turbine 25 will increase. At the same time, cooling in the heat-exchanger 25 shall be decreased, so that the temperature of the gas upstream of the turbine 25 is maintained at an unchanged, high level. Thus, a particular characteristic of the three aforedescribed embodiments resides in the possibility of adding water to the air of combustion or the smoke gases, and to then permit the water to condense in the terminal cooling stage, prior to the terminal expansion stage.

We claim:

1. A method of recovering heat from smoke gases in a combustion plant comprising the steps of compressing air for combustion to a first intermediate pressure in a first compressor, then compressing the air to a second higher pressure in a second compressor, passing the air at said second higher pressure to a combustion chamber, burning a combustible fuel containing water in the presence of said air at said second higher pressure in the combustion chamber to produce smoke gases containing water vapor at substantially said second higher pressure, passing said smoke gases at said second higher pressure through a first turbine to drive the turbine and reduce the pressure of said smoke gases to a second intermediate pressure, said first turbine being connected to said second compressor for driving the same, thereafter condensing water vapor in said smoke gases at said second intermediate pressure to regain the heat of vaporazation of the water vapor in the smoke gases, and then passing said smoke gases through a second turbine to drive the turbine and reduce the pressure of said smoke gases to atmospheric pressure, said second turbine being connected to said first compressor for driving the same.

2. A combustion plant for recovering heat from smoke gases comprising first and second compressor means connected in series to raise the pressure of combustion air from atmospheric pressure to a first intermediate pressure and thence to a second higher pressure, at least one combustion chamber means operatively connected to said second compressor means for burning fuel containing water in the presence of said combustion air for producing compressed smoke gases at substantially said second higher pressure; a first turbine means operatively connected to said combustion chamber and said second compressor for receiving said compressed smoke gases and reducing the pressure thereof to a second intermediate pressure thereby converting the pressure of the smoke gases to mechanical energy driving said second compressor means; condenser means connected to said first turbine for receiving the expanded smoke gases therefrom and recapturing the heat of evaporation from the water vapor in said gases; and a second turbine means operatively connected to said condenser means and said first compressor for receiving the expanded smoke gases from said condenser means and reducing the pressure thereof to atmospheric while converting the pressure of the smoke gases to mechanical energy driving said first compressor means.

3. A combustion plant as defined in claim 2 wherein said condenser includes means for regulating the cooling effect produced therein on said smoke gases and permitting control of the smoke gas temperature downstream of the condenser at a relatively constant temperature regardless of variations in the heat output of said combustion chamber.

4. A combustion plant as defined in claim 2 including at least two combustion chamber means, one of which is nearest the condenser means in the direction of gas flow and is adapted to be operated at a varying load whereby the temperature of the smoke gases downstream of the cooler may be maintained substantially constant irrespective of variations in the heat output of the plant.

5. A combustion plant as defined in claim 4 wherein said condenser means comprises means for cooling the smoke gases from the first turbine to a temperature which is lower than 1.2 times the temperature of the cooling medium used in the condenser, expressed in degress Kelvin.

6. A combustion plant as defined in claim 4 including a third compressor means connected in series between said first and second compressor means and a third turbine means operatively connected between said first and second turbines and to said third compressor means for driving the same.

7. A combustion plant as defined in claim 4 including at least one compressor and turbine connected in parallel to one of said first and second compressors and turbines respectively.

8. A combustion plant as defined in claim 2 wherein said condenser means comprises means for heating a supply of water.

9. The method of recovering heat from smoke gases in a combustion plant comprising the steps of compressing air for combustion in at least one compressor to a pressure substantially above atmospheric pressure, combusting fuel in the presence of said compressed air to produce smoke gases containing water vapor having a temperature in the range of about 600° C. to 800° C., thereafter condensing the water vapor in said smoke gases in a heat-exchanger/condenser to reduce the temperature of said smoke gases to between 50° C. and 100° C. while transferring heat, including regained heat of vaporization, to water flowing in said heat-exchanger/condenser, and thereafter expanding the gases in a turbine connected to said compressor to mechanically drive the compressor and reduce the pressure and temperature of the smoke gases to substantially atmospheric temperature and pressure.

* * * * *